US 9,046,165 B2

(12) United States Patent
Jeng et al.

(10) Patent No.: US 9,046,165 B2
(45) Date of Patent: Jun. 2, 2015

(54) BALL SCREW CAPABLE OF THERMAL DISSIPATION BASED ON THERMOELECTRIC COOLER

(71) Applicant: NATIONAL CHUNG CHENG UNIVERSITY, Chia-Yi County (TW)

(72) Inventors: Yeau-Ren Jeng, Tainan (TW); Yu-Xian Huang, Tainan (TW)

(73) Assignee: National Chung Cheng University, Min-Hsiung, Chia-Yi County (TW)

( * ) Notice: Subject to any disclaimer, the term of this patent is extended or adjusted under 35 U.S.C. 154(b) by 2 days.

(21) Appl. No.: 14/058,744

(22) Filed: Oct. 21, 2013

(65) Prior Publication Data

US 2015/0107389 A1  Apr. 23, 2015

(51) Int. Cl.
F16H 1/24 (2006.01)
F16H 55/02 (2006.01)
F16H 57/04 (2010.01)
F16H 25/22 (2006.01)

(52) U.S. Cl.
CPC ........ *F16H 57/0415* (2013.01); *F16H 25/2214* (2013.01)

(58) Field of Classification Search
CPC ... F16H 25/20; F16H 25/2204; F16H 57/048; F16H 57/0497
USPC .................. 74/89.23, 424.81, 424.82, 606 A; 165/80.3, 182
See application file for complete search history.

(56) References Cited

U.S. PATENT DOCUMENTS

| 2,959,925 | A | * | 11/1960 | Frantti et al. ..................... 62/3.3 |
| 4,000,664 | A | * | 1/1977 | Christensen ................. 74/89.44 |
| 5,415,489 | A | * | 5/1995 | Hutchins et al. ............... 403/76 |
| 5,927,144 | A | * | 7/1999 | Koch ........................... 74/89.36 |
| 6,817,260 | B2 | * | 11/2004 | Liao ............................ 74/89.43 |
| 8,336,416 | B2 | * | 12/2012 | Chiu et al. ................. 74/424.87 |
| 2002/0152822 | A1 | | 10/2002 | Chuo |
| 2012/0011949 | A1 | * | 1/2012 | Rosengren et al. ............... 74/89 |
| 2013/0112025 | A1 | * | 5/2013 | Jeng et al. ................. 74/424.81 |
| 2013/0145877 | A1 | * | 6/2013 | Horng et al. .............. 74/424.71 |

FOREIGN PATENT DOCUMENTS

| JP | 11333666 A | * | 12/1999 |
| TW | I287073 | | 9/2007 |
| TW | M323540 | | 12/2007 |
| TW | I300375 | | 9/2008 |

OTHER PUBLICATIONS

Machine translation of JP 11-333666 A.*

* cited by examiner

*Primary Examiner* — Justin Krause
(74) *Attorney, Agent, or Firm* — Muncy, Geissler, Olds & Lowe, P.C.

(57) ABSTRACT

A ball screw capable of thermal dissipation is formed of a screw rod, a screw nut, and a plurality of balls mounted between the screw rod and the screw nut. The screw nut includes a mounting surface. A thermoelectric cooler is mounted to the screw nut and includes a heat-absorptive surface and a heat-dissipative surface. The heat-absorptive surface is adhered to the mounting surface. Accordingly, the ball screw can cool the heat down and is structurally simple and the whole weight is not increased due to the thermoelectric cooler.

7 Claims, 8 Drawing Sheets

BALL SCREW CAPABLE OF THERMAL DISSIPATION BASED ON THERMOELECTRIC COOLER

BACKGROUND OF THE INVENTION

1. Field of the Invention

The present invention relates generally to the thermal dissipation of the ball screw and more particularly, to a ball screw capable of thermal dissipation based on a thermoelectric cooler.

2. Description of the Related Art

Balls moving inside a ball screw are very sensitive to temperature rise and when the temperature rise reaches 20° C. locally, the inaccuracy of one-meter stroke of the ball rod may reach 100 µm frequently. As the moving speed is higher, the noise and thermal energy may become greater to result in adverse effect on the working environment and the positioning precision. For this reason, the thermal energy generated while the ball screw is working needs to be dissipated.

Taiwan Patent No. I287073 disclosed that a cooling channel is applied to a ball screw; namely, the cooling channel is created around the screw nut to take away the heat generated in operation by liquid circulation to reach the purposes of cooling and precise positioning.

Taiwan Patent No. I300375 disclosed a cooling device for a ball screw, in which a flow channel runs through a central axis of the screw rod and a propeller is mounted inside the flow channel for generating spiral agitation to make the cooling liquid moving forward. In this way, the cooling effect can be boosted to further enhance the service life and precision of the ball screw.

Taiwan Patent No. M323540 disclosed a lubricating cooling system for a ball screw, in which the cooling device is an oil-mist supply system based on Venturi tube for atomizing the lubricating oil into oil mist and keeping supplying the lubrication and cooling among the ball screw, the screw rod, and the balls with the oil mist to further enhance the service life and precision of the ball screw.

However, all of the aforesaid patents adopted the cooling liquid or the oil to make the whole structures complicated to further make the processing and the assembly both uneasy and increase the size and weight of the ball screw. Thus, the aforesaid patents still need further improvement.

SUMMARY OF THE INVENTION

The primary objective of the present invention is to provide a ball screw that is capable of thermal dissipation without complicated structure.

The secondary objective of the present invention is to provide a ball screw that is not heavier and even lighter than the conventional ball screw.

The foregoing objectives of the present invention are attained by the ball screw formed of a screw rod, a screw nut, and a plurality of balls mounted between the screw rod and the screw nut. The screw nut includes a mounting surface. A thermoelectric cooler is mounted to the screw nut and includes a heat-absorptive surface and a heat-dissipative surface. The heat-absorptive surface is adhered to the mounting surface.

DETAILED DESCRIPTION OF PREFERRED EMBODIMENTS

Structural features and desired effects of the present invention will become more fully understood by reference to three preferred embodiments given hereunder. However, it is to be understood that these embodiments are given by way of illustration only, thus are not limitative of the claim scope of the present invention.

Figure 1:
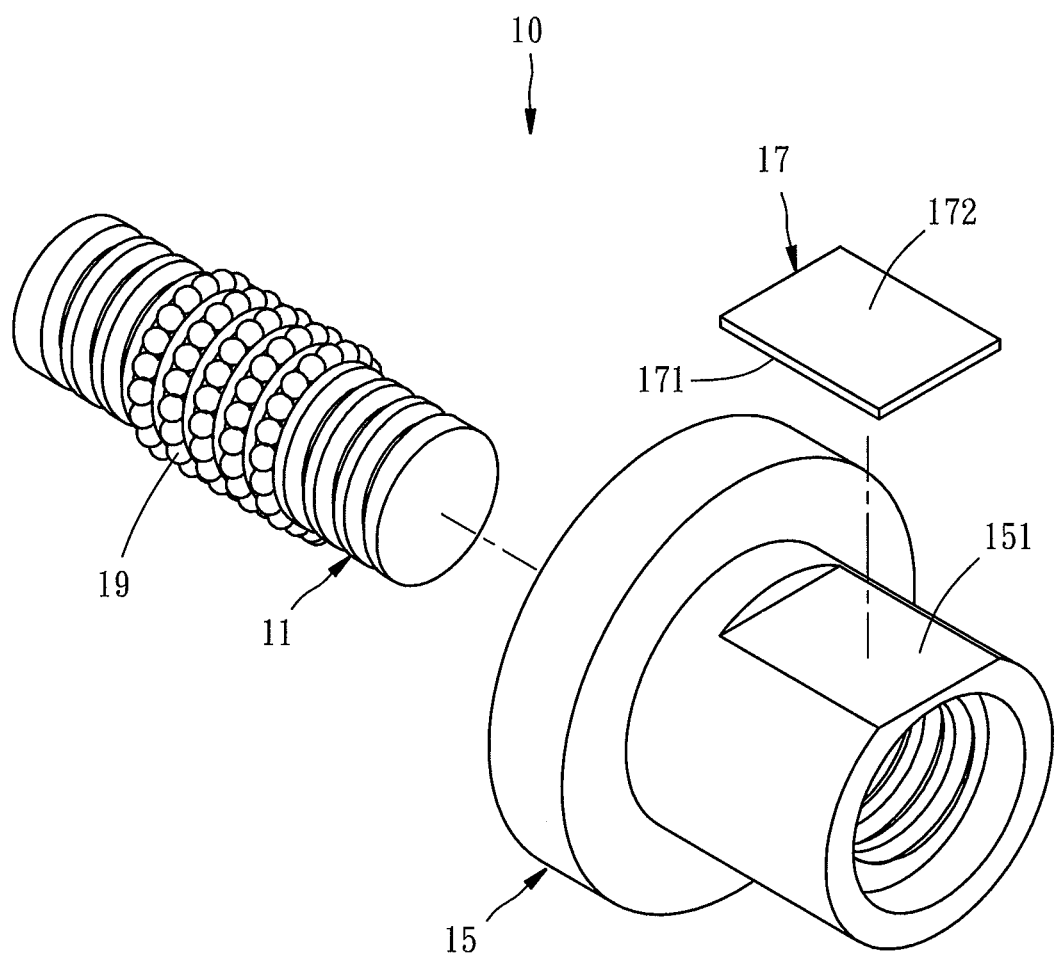
FIG. 1 is an exploded view of a first preferred embodiment of the present invention.
Figure 2:
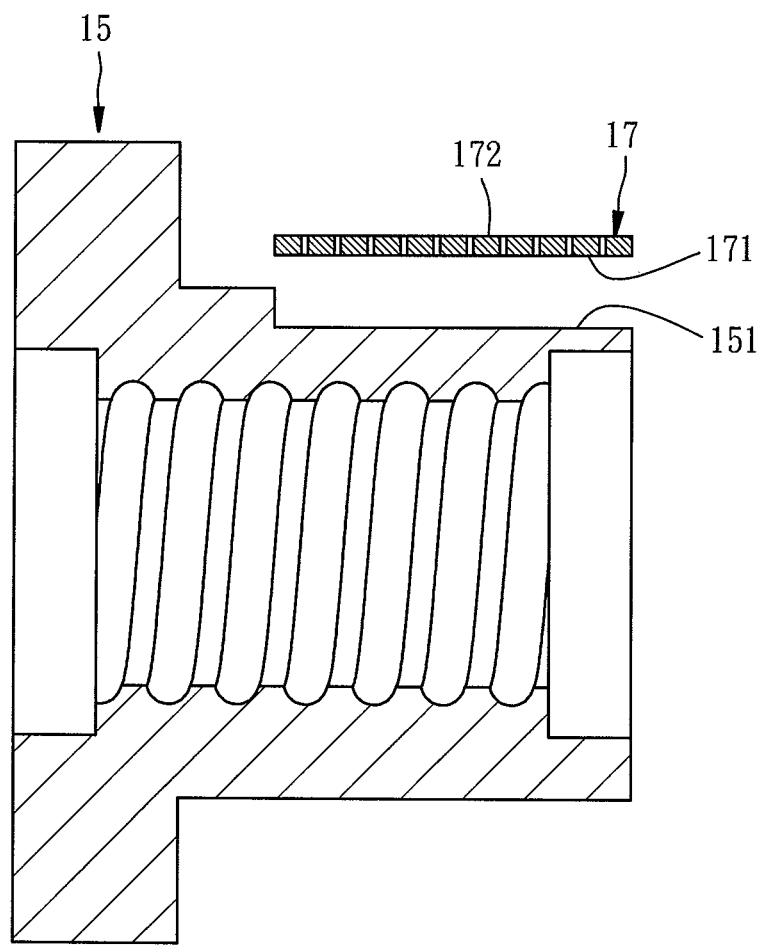
FIG. 2 is a sectional view of the first preferred embodiment of the present invention.
Figure 3:
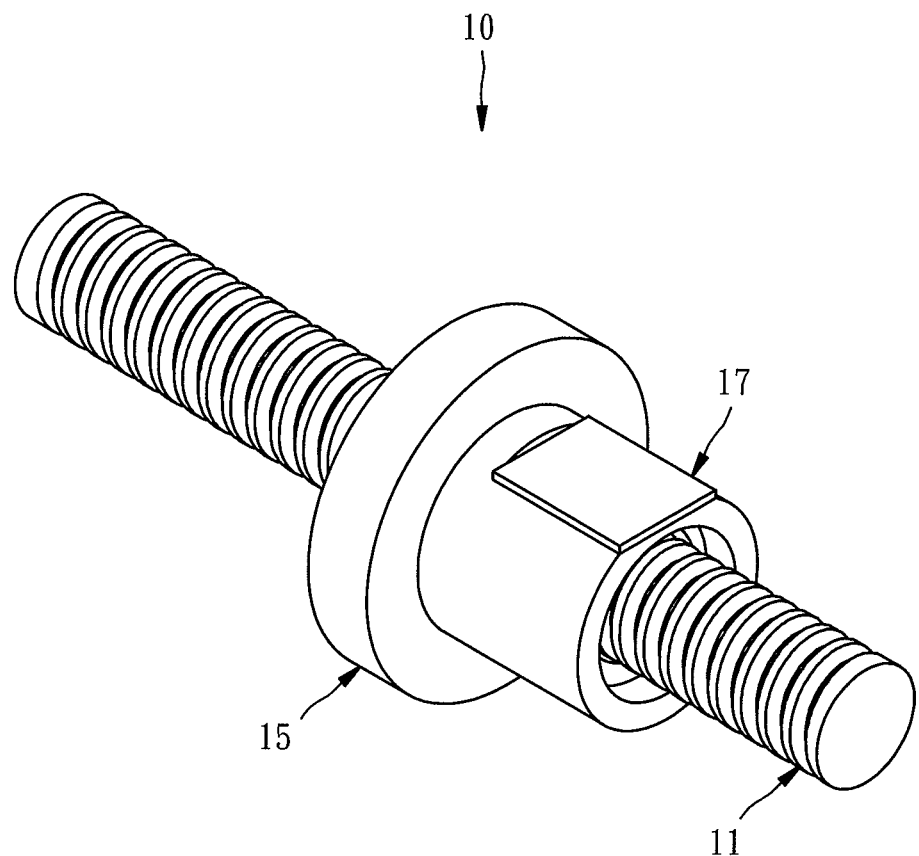
FIG. 3 is a perspective view of the first preferred embodiment of the present invention.

Referring to FIGS. 1-3, a ball screw 10 capable of thermal dissipation in accordance with a first preferred embodiment of the present invention is formed of a screw rod 11, a screw nut 15, and a thermoelectric cooler 17. The detailed descriptions and operations of these elements as well as their interrelations are recited in the respective paragraphs as follows.

A plurality of balls 19 are mounted between the screw rod 11 and the screw nut 15.

The screw nut 15 includes a mounting surface 151.

The thermoelectric cooler 17 includes a heat-absorptive surface 171 and a heat-dissipative surface 172. The heat-absorptive surface 171 is adhered to the mounting surface 151 of the screw nut 15. In this embodiment, the mounting surface 151 is planar and the heat-absorptive surface 171 and the heat-dissipative surface 172 are also planar. As the person of ordinary skill in the art knows, as long as the thermoelectric cooler 17 is electrically connected with a power source (not shown), the heat-absorptive surface 171 can absorb and transfer the heat to the heat-dissipative surface 172 for thermal dissipation. How to install the power source belongs to the prior art and is not significant in the present invention, so no more recitation is necessary.

In the process of operation of the ball screw 10, the heat generated can be transferred to the screw nut 15 and when the thermoelectric cooler 17 is powered up, the heat of the screw nut 15 can be transferred to the heat-dissipative surface 172 for thermal dissipation, so in this way, the ball screw 10 can be cooled down.

In structure, the thermoelectric cooler 17 is nothing but adhered to the mounting surface 151 of the screw 15, so compared with the conventional ball screw having the conventional cooling liquid, the ball screw 10 of the present invention is structurally simpler rather than complicated.

In addition, the thermoelectric cooler 17 is very light in weight and installed to the mounting surface 151, so the whole weight of the present invention can be hardly increased.

Figure 4:
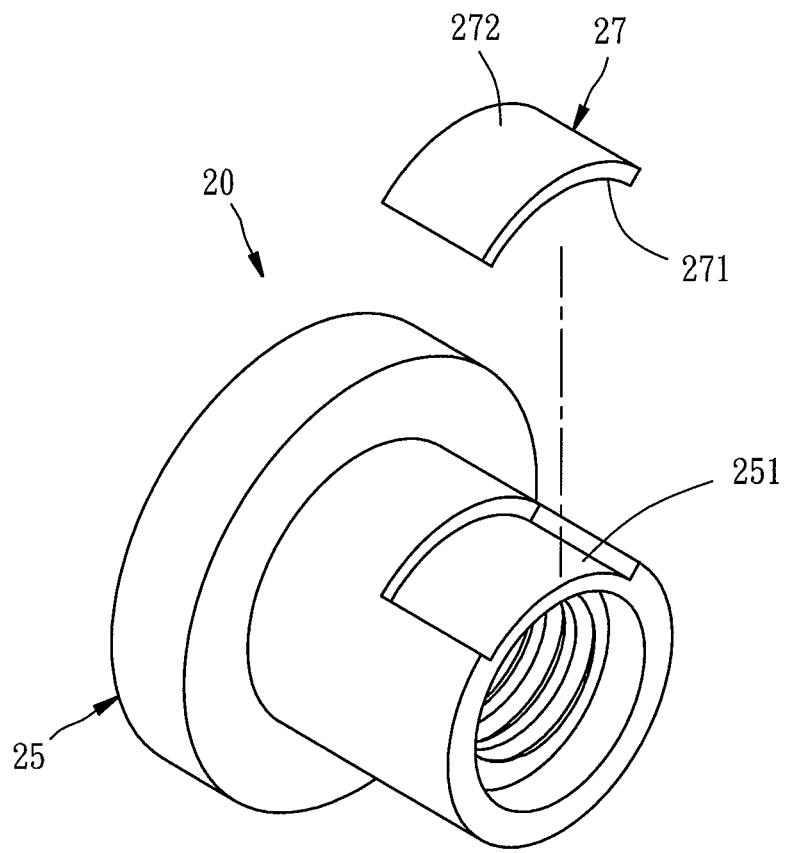
FIG. 4 is an exploded view of a second preferred embodiment of the present invention.
Figure 5:
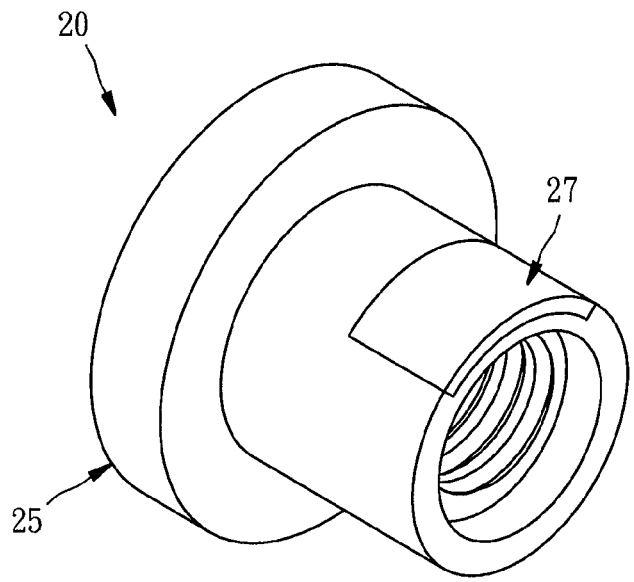
FIG. 5 is a perspective view of the second preferred embodiment of the present invention.

Referring to FIGS. 4 and 5, a ball screw 20 capable of thermal dissipation in accordance with a second preferred embodiment of the present invention is similar to that of the first preferred embodiment, having the following difference.

The mounting surface 251 is cambered and the heat-absorptive surface 271 corresponds to the mounting surface 251 to be cambered, so the mounting surface 251 can match the screw nut 25 to further beautify the appearance of the ball screw 20. In addition, the heat-dissipative surface 272 is also cambered and the mounting surface 251 is recessed downward from an external surface of the screw nut 25 for a predetermined depth (a cutout) that prevents the heat-dissipative surface 272 from protruding from the external surface of the screw nut 25, i.e. the heat-dissipative surface 272 is not higher than the external surface of the screw nut 25, so the size of the screw nut 25 is not increased. However, the thermoelectric cooler 27 is lighter than the cutout, so the whole weight of the ball screw 20 is smaller than that of the first preferred embodiment of the present invention.

Figure 6:
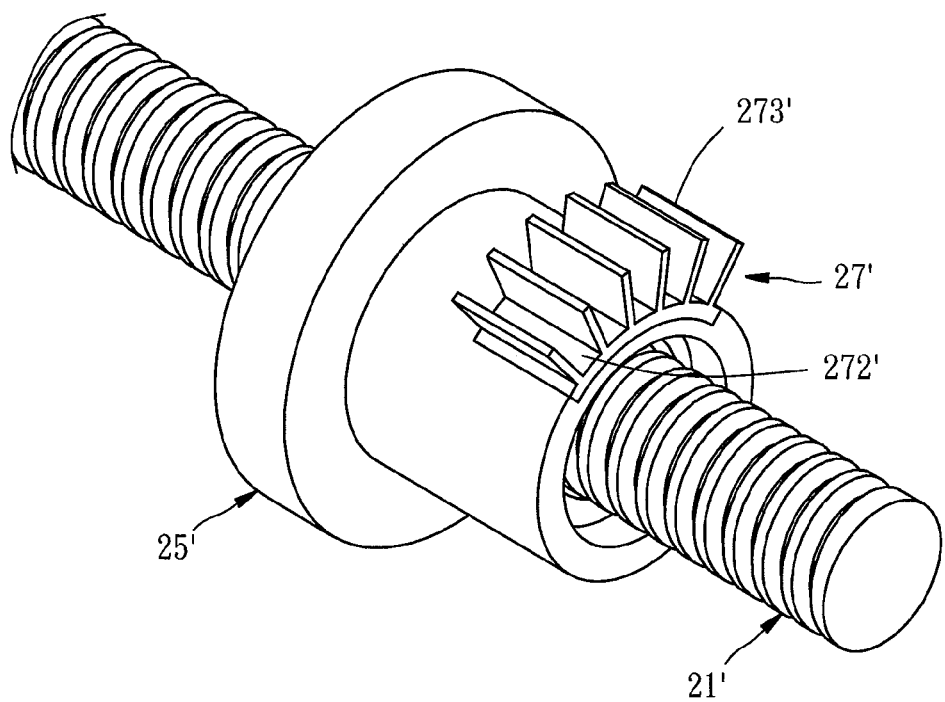
FIG. 6 is an exploded view of an alternative pattern of the second preferred embodiment of the present invention.

Referring to FIG. 6, in an alternative pattern, a plurality of cooling fins 273' can be mounted to the heat-dissipating surface 272' of the thermoelectric cooler 27' and extend along the moving direction of the screw nut 25' on the screw rod 21' to be shaped like elongated sheets. The cooling fins 273' make the heat-dissipative area larger to have preferable thermal dissipation.

Figure 7:
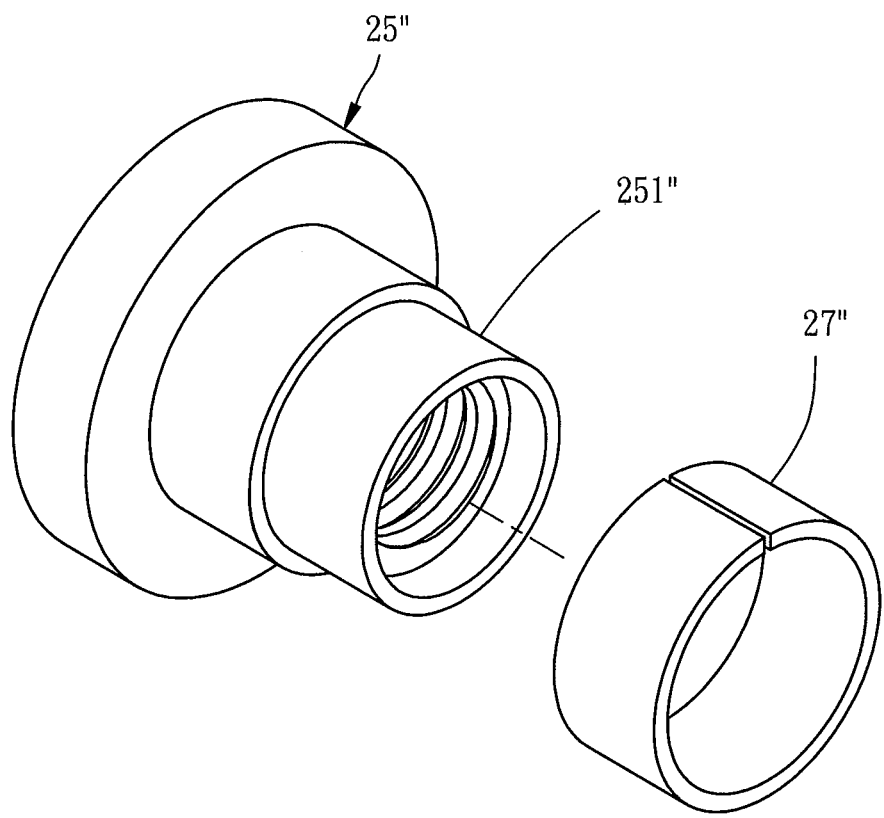
FIG. 7 is an exploded view of another alternative pattern of the second preferred embodiment of the present invention.

Referring to FIG. 7, in an alternative pattern, the mounting surface 251" is recessed annularly from an external surface of the screw nut 25" and the thermoelectric cooler 27" is adhered to the mounting surface 251" to surround the screw nut 25". In this way, the heat-dissipative area becomes larger to have preferable thermal dissipation.

Figure 8:
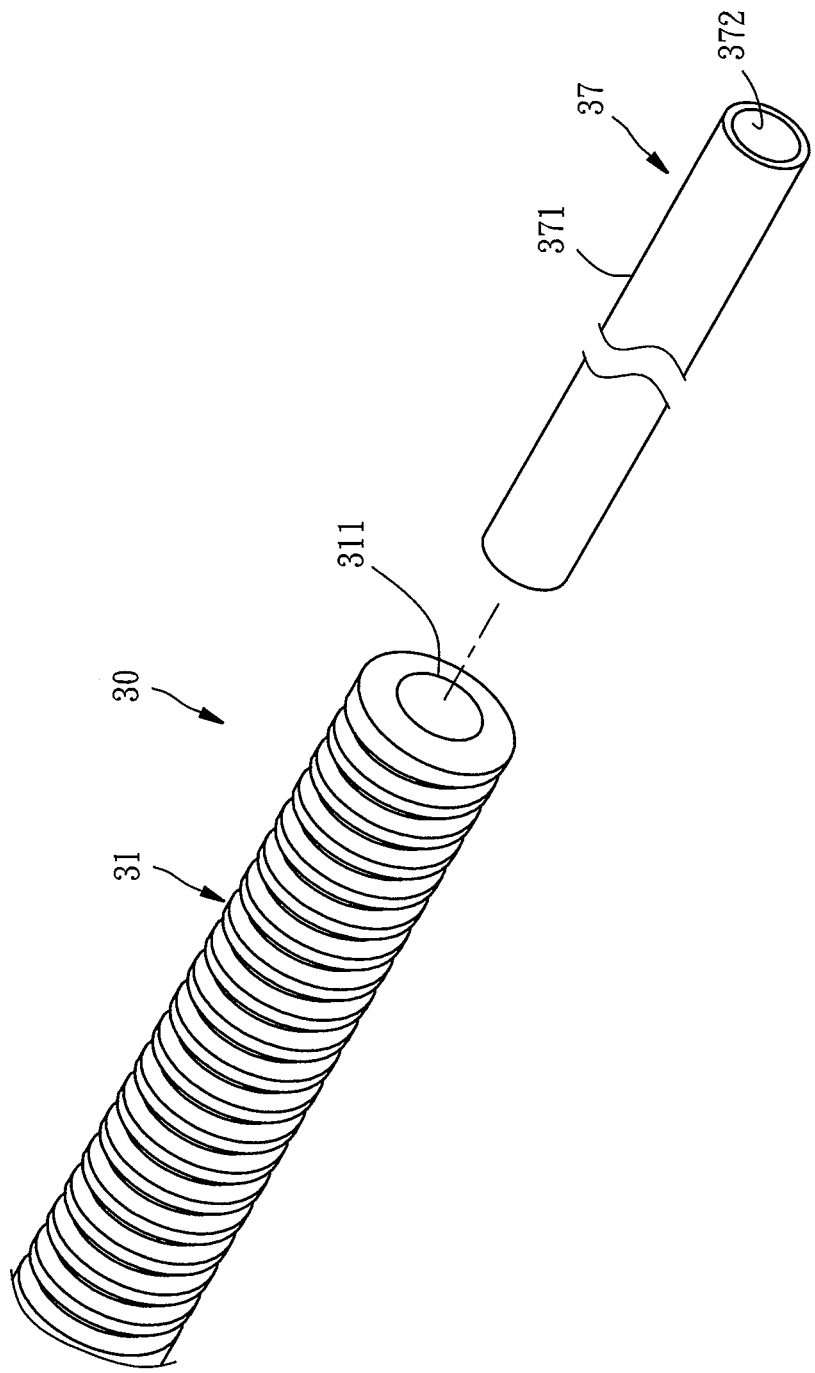
FIG. 8 is a partially exploded view of a third preferred embodiment of the present invention.

Referring to FIG. 8, a ball screw 30 capable of thermal dissipation in accordance with a third preferred embodiment of the present invention is similar to that of the first preferred embodiment, having the following difference.

The screw nut (not shown) does not include the mounting surface but includes a channel 311 running through the screw rod 31.

The thermoelectric cooler 37 is tubular, in which its external periphery is the heat-absorptive surface 371 and its internal periphery is the heat-dissipative surface 372. The heat-absorptive surface 371 is adhered to an internal periphery of the channel 311 of the screw rod 31. In this way, the thermoelectric cooler 37 can transfer the heat of the screw rod 31 to the heat-dissipative surface 372 of the thermoelectric cooler 37 through the heat-absorptive surface 371 and then the heat is dissipated outward.

Figure 9:
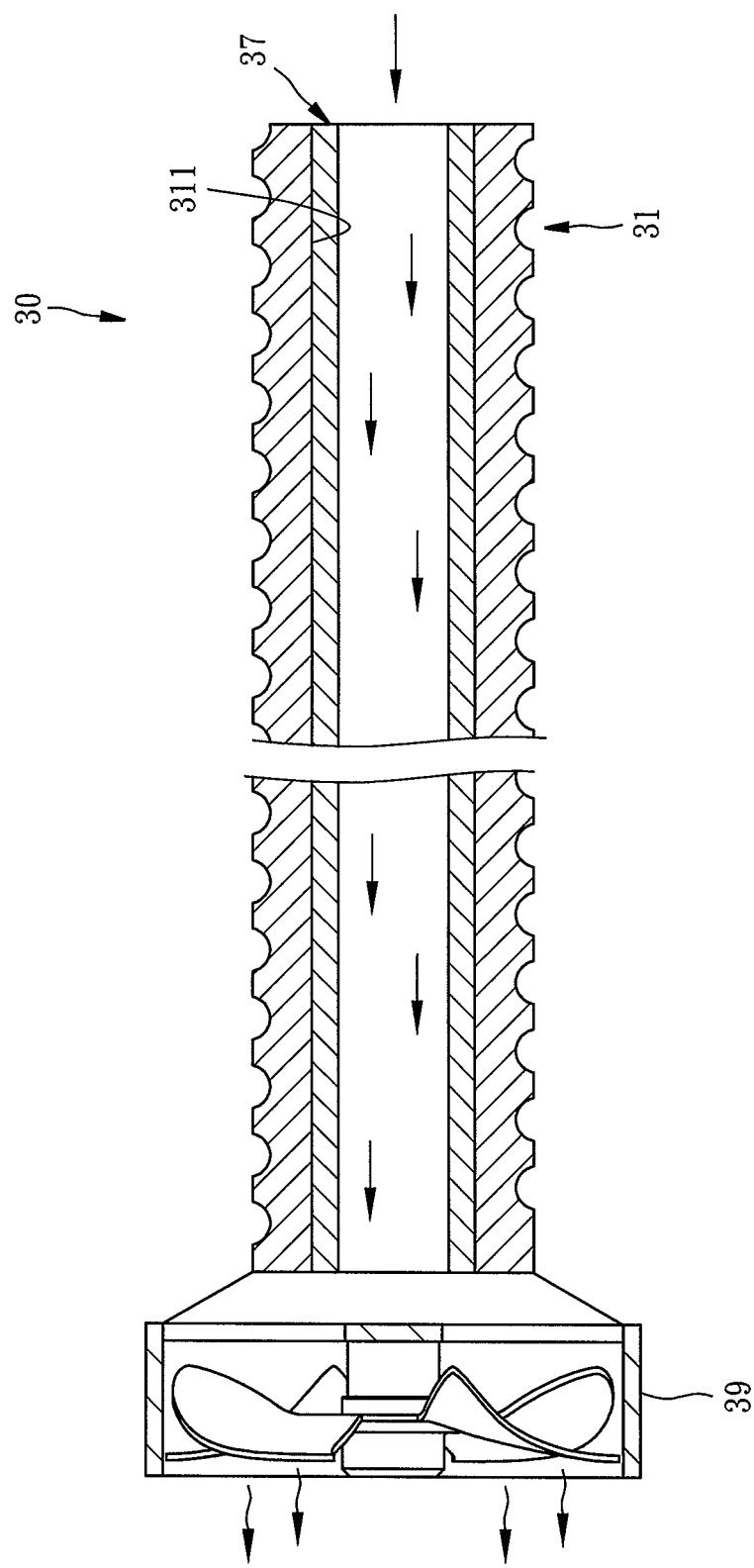
FIG. 9 is a partially sectional view of the third preferred embodiment of the present invention.

Referring to FIG. 9, in an alternative pattern, an air-driving device 39 is mounted to the screw rod 31 and located at one end of the channel 311 for driving the air inside the thermoelectric cooler 37, e.g. the air is evacuated or blown. In this way, the air inside the thermoelectric cooler 37 can be taken away from the screw rod 31 to further dissipate the heat for preferable thermal dissipation.

In light of the above, the heat generated in the process of operation of the ball screw 30 can be transferred to the screw rod 31 and when the thermoelectric cooler 37 is powered up, the heat can be dissipated outward, so the balls screw 30 can be cooled down.

The other structures and effects that can be reached in the third preferred embodiment are identical to those of the first preferred embodiment, so detailed description is skipped.

What is claimed is:

1. A ball screw capable of thermal dissipation, comprising a screw rod, a screw nut, and a plurality of balls located between the screw rod and the screw nut, wherein the screw nut comprises a mounting surface and the ball screw further comprises a thermoelectric cooler having a heat-absorptive surface and a heat-dissipative surface, the heat-absorptive surface being adhered to the mounting of the screw nut,
   wherein the mounting surface is planar, and both of the heat-absorptive surface and the heat-dissipative surface of the thermoelectric cooler are planar, and
   wherein the mounting surface is recessed downward from an external surface of the screw nut for a predetermined depth that prevents the heat-dissipative surface from being higher than the external surface of the screw nut.

2. The ball screw as defined in claim 1, wherein the heat-dissipative surface of the thermoelectric cooler comprises a plurality of cooling fins.

3. The ball screw as defined in claim 2, wherein the cooling fins are located on the heat-dissipating surface and extend along a moving direction of the screw nut on the screw rod.

4. A ball screw capable of thermal dissipation, comprising a screw rod, a screw nut, and a plurality of balls located between the screw rod and the screw nut, wherein the screw nut comprises a mounting surface and the ball screw further comprises a thermoelectric cooler having a heat-absorptive surface and a heat-dissipative surface, the heat-absorptive surface being adhered to the mounting surface of the screw nut,
   wherein the mounting surface is cambered, and the heat-absorptive surface of the thermoelectric cooler is also cambered to correspond to the mounting surface, and
   wherein the mounting surface is recessed downward from an external surface of the screw nut for a predetermined depth that prevents the heat-dissipative surface from being higher than the external surface of the screw nut.

5. The ball screw as defined in claim 4, wherein the heat-dissipative surface of the thermoelectric cooler is cambered.

6. The ball screw as defined in claim 4, wherein the heat-dissipative surface of the thermoelectric cooler comprises a plurality of cooling fins.

7. The ball screw as defined in claim 6, wherein the plurality of cooling fins are located on the heat-dissipating surface and extend along a moving direction of the screw nut on the screw rod.

* * * * *